United States Patent
Liu et al.

(10) Patent No.: US 10,262,012 B2
(45) Date of Patent: Apr. 16, 2019

(54) TECHNIQUES RELATED TO BINARY ENCODING OF HIERARCHICAL DATA OBJECTS TO SUPPORT EFFICIENT PATH NAVIGATION OF THE HIERARCHICAL DATA OBJECTS

(71) Applicant: Oracle International Corporation, Redwood Shores, CA (US)

(72) Inventors: Zhen Hua Liu, San Mateo, CA (US); Beda Hammerschmidt, Los Gatos, CA (US); Douglas McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 762 days.

(21) Appl. No.: 14/836,680

(22) Filed: Aug. 26, 2015

(65) Prior Publication Data
US 2017/0060912 A1   Mar. 2, 2017

(51) Int. Cl.
*G06F 17/30* (2006.01)
(52) U.S. Cl.
CPC .... *G06F 17/30303* (2013.01); *G06F 17/3033* (2013.01); *G06F 17/30327* (2013.01); *G06F 17/30589* (2013.01); *G06F 17/30917* (2013.01)

(58) Field of Classification Search
CPC .................................................. G06F 7/2247
(Continued)

(56) References Cited

U.S. PATENT DOCUMENTS 7,644,014 B2   1/2010   Viswanath
7,877,400 B1   1/2011   Matthew
(Continued)

FOREIGN PATENT DOCUMENTS

WO   WO 03/107222 A1   12/2003
WO   WO 2015/041967 A1   3/2015
WO   WO 2015/069941   5/2015

OTHER PUBLICATIONS

Roth et al., "Don't Scrap It Wrap it!, A Wrapper Architecture for Legacy Data Sources", Proceedings of the International Conference on Very Largedata Bases, dated Aug. 26, 1997, 10 pages.
(Continued)

*Primary Examiner* — Baoquoc N To
(74) *Attorney, Agent, or Firm* — Hickman Palermo Becker Bingham LLP

(57) ABSTRACT

Techniques related to binary encoding of hierarchical data objects to support efficient path navigation of the hierarchical data objects are disclosed. A hierarchical data object may include field names that are associated with field values. A method may involve generating a plurality of hash codes, each hash code corresponding to a respective field name. The method may involve generating a hash-code mapping that maps each hash code to a respective field-name identifier. The method may involve generating a field-name mapping that maps each field name to a respective field-name identifier. The method may involve generating a hierarchical tree of nodes that includes non-leaf nodes and leaf nodes. A particular non-leaf node may include a child node mapping that maps the particular non-leaf node to one or more child nodes and may include a field-name-identifier-to-child mapping that maps a respective field-name identifier to each of the one or more child nodes.

24 Claims, 9 Drawing Sheets

(58) Field of Classification Search
USPC .................................................. 707/791, 803
See application file for complete search history.

(56) References Cited

U.S. PATENT DOCUMENTS

| | | | |
|---|---|---|---|
| 8,578,261 | B1 | 11/2013 | Gupta |
| 9,037,614 | B1* | 5/2015 | Parrott .............. G06F 17/30607 |
| | | | 707/803 |
| 2005/0044089 | A1 | 2/2005 | Wu |
| 2007/0255748 | A1 | 11/2007 | Ferragina |
| 2008/0065596 | A1 | 3/2008 | Shadmon |
| 2009/0063538 | A1 | 3/2009 | Chitrapura |
| 2009/0307241 | A1 | 12/2009 | Schimunek et al. |
| 2010/0325169 | A1 | 12/2010 | Loh |
| 2011/0113036 | A1 | 5/2011 | Idicula et al. |
| 2012/0036133 | A1 | 2/2012 | Chen et al. |
| 2014/0032615 | A1 | 1/2014 | Hammerschmidt et al. |
| 2014/0244692 | A1* | 8/2014 | Williamson ...... G06F 17/30923 |
| | | | 707/791 |
| 2015/0134602 | A1* | 5/2015 | Nicholas ........... G06F 17/30345 |
| | | | 707/609 |
| 2016/0162218 | A1* | 6/2016 | Callaway .............. G06F 3/0641 |
| | | | 707/692 |
| 2016/0294651 | A1 | 10/2016 | Renna |

OTHER PUBLICATIONS

Candillier et al., "Mining XML Documents In: Data Mining Patterns: New Methods and Applications", dated Nov. 19, 2007, IGI Global, 28 pages.

Anonymous: "Oracle Database In-Memory: Powering the Real-Time Enterprise", dated Dec. 31, 2014, 9 pages.

Abello et al., "Data Warehousing, Handbook of Massive Datasets", dated Apr. 1, 2002, Springer, 4 pages.

Wikipedia, the free encyclopedia, "Protocol Buffers", last viewed on Dec. 28, 2015, https://en.wikipedia.org/wiki/Protocol_Buffers, 3 pages.

Wikipedia, the free encyclopedia, "BSON", last viewed on Dec. 28, 2015, https://en.wikipedia.org/wiki/BSON, 3 pages.

Wikipedia, the free encyclopedia, "Apache Avro", https://en.wikipedia.org/wiki/Apache_Avro last viewed on Dec. 28, 2015, 2 pages.

Lui, U.S. Appl. No. 15/162,235, filed May 23, 2016, Interview Summary, dated Oct. 2, 2018.

Liu, U.S. Appl. No. 15/162,235, filed May 23, 2016, Final Office Action, dated Oct. 2, 2018.

* cited by examiner

FIG. 1

HIERARCHICAL DATA OBJECT 100

```
{
    "person" : {
        "id" : '123',
        "name" : 'john',
        "birthdate" : '1970-01-02',
        "friends" : [
            {
                "person" : {
                    "id" : '456',
                    "name" : 'Mary',
                    "birthdate" : '1968-04-03'
                }
            },
            {
                "person" : {
                    "id" : '789',
                    "name" : 'Henry',
                    "birthdate" : '1972-03-03'
                }
            }
        ],
        "location" : {
            "city" : 'Oakland',
            "zip" : '94403'
        }
    }
}
```

FIG. 2

TABLE 200

| FIELD-NAME IDENTIFIERS 202 | FIELD NAMES 204 | HASH CODES 206 |
|---|---|---|
| 0x1 | "id" | 0x286F5900 |
| 0x2 | "person" | 0x30ACE070 |
| 0x3 | "city" | 0x62E4707C |
| 0x4 | "birthdate" | 0x7451A273 |
| 0x5 | "location" | 0x980FF8A0 |
| 0x6 | "name" | 0xA275727C |
| 0x7 | "friends" | 0xE4504E6E |
| 0x8 | "zip" | 0xE6AC870B |

HASH-CODE MAPPING 208

[ 0x28, 0x30, 0x62, 0x74, 0x98, 0xA2, 0xE4, 0xE6 ]

US 10,262,012 B2

TECHNIQUES RELATED TO BINARY ENCODING OF HIERARCHICAL DATA OBJECTS TO SUPPORT EFFICIENT PATH NAVIGATION OF THE HIERARCHICAL DATA OBJECTS

FIELD OF THE DISCLOSURE

Embodiments relate to information retrieval technology and more specifically, to efficient storage and navigation of hierarchical data objects.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Hierarchical data objects, such as JavaScript Object Notation (JSON) documents, are becoming an increasingly popular vehicle for transmitting and storing data. However, querying the hierarchical data objects may be computationally expensive, particularly as the hierarchical data objects store an ever-increasing amount of data. An approach for reducing the algorithmic complexity of executing a query may involve binary encoding of a hierarchical data object. However, this approach may introduce the overhead and complexity of managing a central dictionary or schema. Another approach may involve compressing data to utilize a smaller memory footprint. However, compression schemes typically require all data to be decompressed before specific data can be accessed. Yet another approach may involve tree-structured data that allows skipping of data irrelevant to the query. However, tree-structured data may still require a linear scan of all child nodes at any given level due to the absence of a predictable order to the child nodes. Thus, there is a need for a comprehensive approach that effectively reduces algorithmic complexity in terms of both time and space.

BRIEF DESCRIPTION OF THE DRAWINGS

In the drawings:

FIG. 1 depicts an example hierarchical data object.

FIG. 2 depicts example fields used to compactly represent field names.

DETAILED DESCRIPTION

Figure 3:
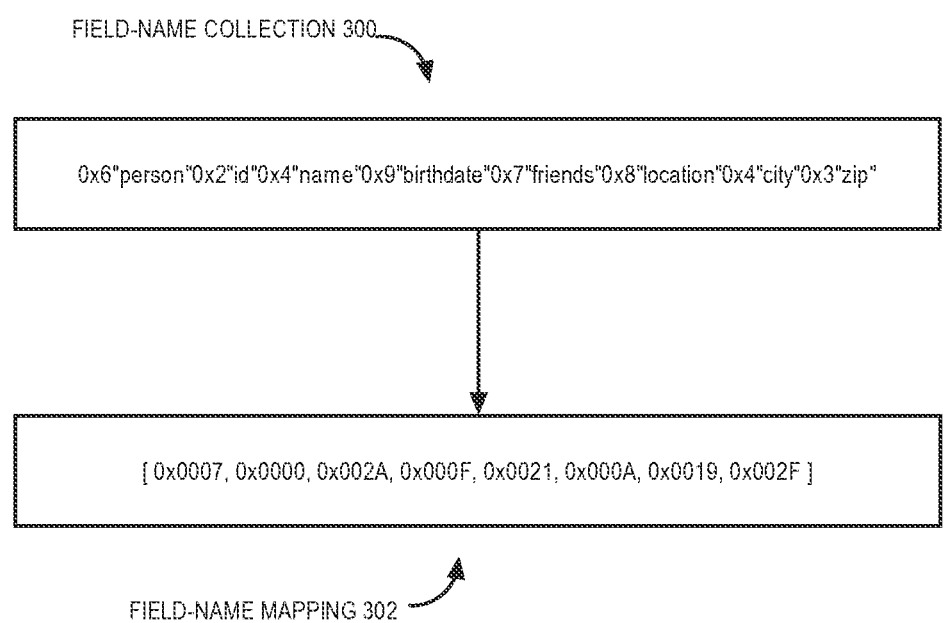
FIG. 3 depicts an example approach for referencing field names by abbreviated identifiers.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first", "second", and "third" may be used to differentiate elements, but the modifiers do not necessarily indicate any particular order. For example, a first mapping may be so named although, in reality, it may be a second, third, and/or fourth mapping. For the sake of clarity and ease of understanding, binary numbers may be represented as hexadecimal numbers in the figures and in the following examples. The present disclosure assumes a Big-Endian platform, but the following description may easily be adapted for a Little-Endian platform.

General Overview

In an embodiment, efficient storage and navigation of hierarchical data objects may be achieved based on encoding a tree node structure that enables skipping irrelevant child nodes. Each parent node may include a first mapping that indicates a byte offset for each of its child nodes. If a parent node has one or more child nodes that each correspond to a field name, the parent node may also include a second mapping that maps a field name to each child node of the parent node. Thus, if a path expression includes a particular field name, the tree node that corresponds to the particular field name may be identified without scanning any tree nodes unrelated to the path expression.

Further efficiency in storage and navigation of hierarchical data objects may be achieved based on field-name identifiers that numerically represent field names so as to enable a binary search to be performed on the second mapping for a particular field name. Even further efficiency may be achieved when field-name identifiers are binary numbers. A third mapping may be used to store the relationship between field names and field-name identifiers.

The algorithmic complexity of navigating hierarchical data objects may also be reduced by consolidating duplicate field names. A hash function may be used to assign a hash code to each unique field name. Each hash code may be associated with field names in the third mapping based on a fourth mapping that stores the relationship between hash codes and field-name identifiers.

Example Hierarchical Data Object

FIG. 1 depicts an example hierarchical data object. In the example of FIG. 1, hierarchical data object 100 is a JSON document. However, in an embodiment, hierarchical data object 100 may be a JSON object within a JSON document, a Binary JSON (BSON) document, a BSON object within a BSON document, and/or any other instance of a serializable hierarchy of data. For example, in FIG. 1, a JSON object may be represented by data that is enclosed by the curly braces "{" and "}". Thus, a JSON object may be a person and/or a location described in FIG. 1.

Hierarchical data object 100 may include field names that are associated with field values. In the example of FIG. 1, the field names include "person", "id", "birthdate", "friends", "location", "city", and "zip". For JSON objects, field names may precede a colon in a name-value pair. In the example of FIG. 1, the field values include '123', 'john', '1970-01-02', '456', 'Mary', '1968-04-03', '789', 'Henry', '1972-03-03', 'Oakland', and '94403'. For JSON objects, field values may be anything other than a field name or a grouping symbol that follows a colon in a name-value pair. Field values may include a null value, a Boolean value, a string value, a number value, a float value, a double precision value, a date value, a timestamp value, a timestamp with a time zone value, a year-month interval, a day-second interval, a signed binary integer, and/or any other data type. Each field name may be associated with one or more field values in hierarchical data object 100. For example, "person" may be associated with '456', 'Mary', and '1968-04-03'.

Example Root Header Segment

To enable efficient storage and navigation of hierarchical data object 100, hierarchical data object 100 may be encoded in a binary representation that enables skipping based on byte offsets and that reduces digital memory usage by eliminating duplicate field names. In an embodiment, the binary representation includes multiple segments that may be stored and/or transmitted as a concatenation. Subject to memory constraints, the multiple segments may be loaded separately into digital memory using a different lazy-loading policy for each of the multiple segments. A root header segment may be the first segment of the concatenation. The root header segment may provide, among other things, size information for subsequent segments of the concatenation.

The first byte of the root header segment may be reserved for a format identifier. The format identifier may identify a particular encoding, file format, and/or protocol. For example, "0xff" may indicate that the concatenation employs a binary encoding that enables efficient navigation of hierarchical data object 100.

The second byte of the root header segment may be reserved for a version number. For example, "0x1" may indicate that the concatenation is encoded using "version 1" of the binary encoding that enables efficient navigation of hierarchical data object 100.

The next two bytes of the root header segment may be used as a flag field. Each bit may indicate a number of bytes used to store particular information. For example, the first bit of the flag field may indicate whether field-name identifiers described in FIG. 2 are sorted in field-name-identifier-to-child mappings described in FIG. 5. Thus, "10000000" may indicate that the field-name-identifier-to-child mappings are unsorted.

Figure 6:
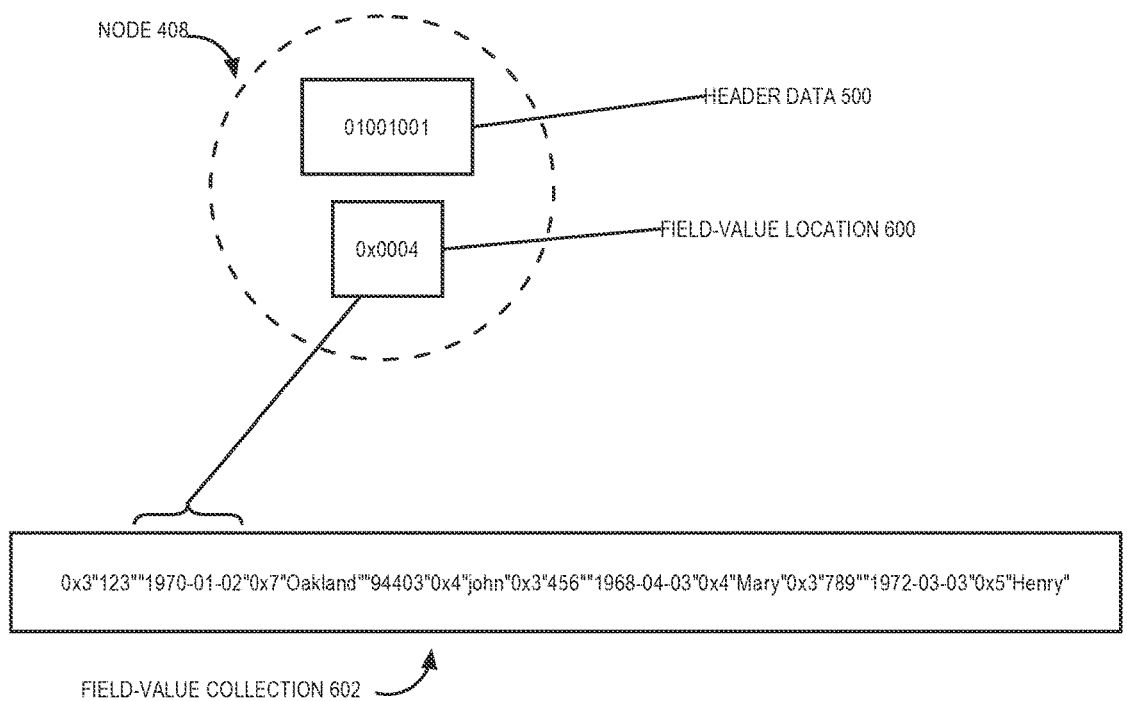
FIG. 6 depicts an example leaf node and an example field-value collection.

The third bit of the flag field may indicate a number of bytes used to store a total size of a field-value collection described in FIG. 6. For example, a flipped bit may indicate that four bytes are used to store a heap size of the field-value collection, and an unflipped bit may indicate that two bytes are used.

Figure 4:
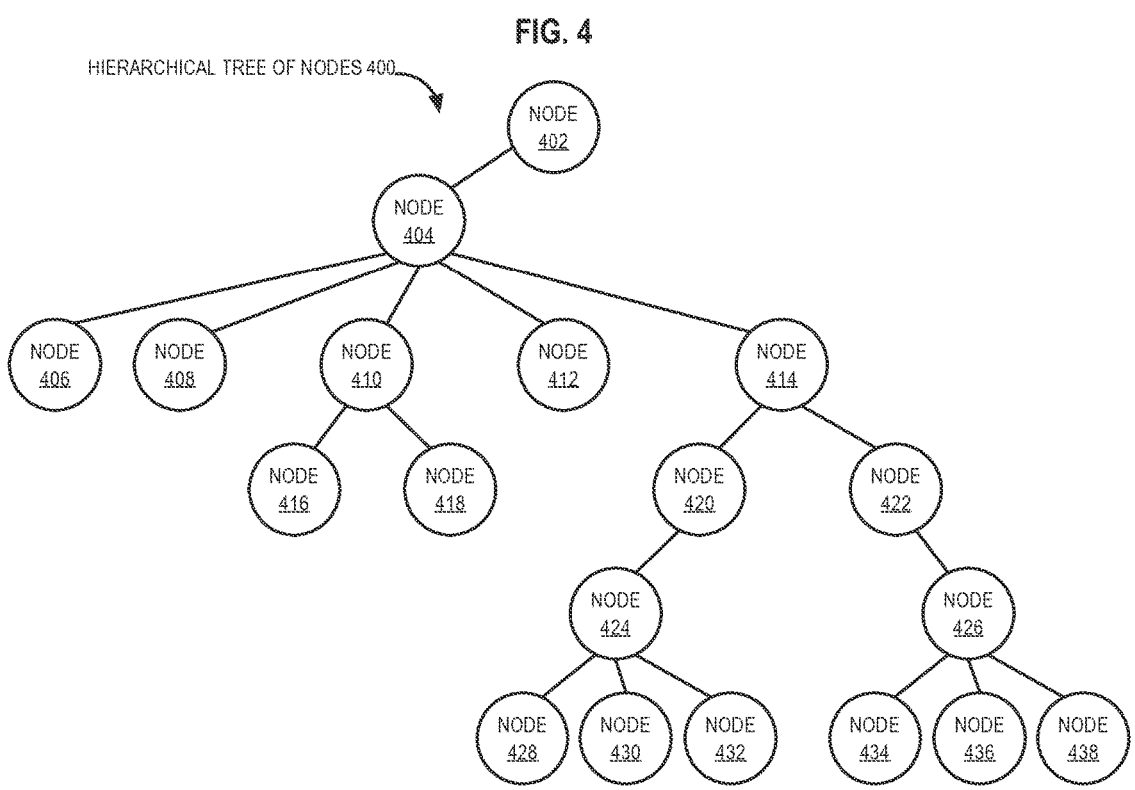
FIG. 4 depicts an example hierarchical tree of nodes.

The fourth bit of the flag field may indicate a number of bytes used to store a total size of a hierarchical tree of nodes described in FIG. 4. For example, a flipped bit may indicate that four bytes are used to store a heap size of the hierarchical tree of nodes, and an unflipped bit may indicate that two bytes are used.

The fifth bit of the flag field may indicate a number of bytes used to store a total size of a field-name collection described in FIG. 3. For example, a flipped bit may indicate that four bytes are used to store a heap size of the field-name collection, and an unflipped bit may indicate that two bytes are used.

The sixth bit of the flag field may indicate a number of bytes used to store a total number of unique field names. For example, a flipped bit may indicate that two bytes are used to store the total number of unique field names, and an unflipped bit may indicate that one byte is used.

The seventh and eighth bits of the flag field may indicate a number of bytes used to store hash codes described in FIG. 2. For example, if the seventh bit is flipped, two bytes of the hash code are stored. If the eighth bit is flipped, one byte of the hash code is stored.

Depending on the sixth bit of the flag field, the next one or two bytes of the root header segment may store the total number of unique field names. For example, if the sixth bit is set to "1", the total number of unique field names may be stored as a two-byte quantity.

Depending on the fifth bit of the flag field, the next two or four bytes of the root header segment may store the total size of the field-name collection. For example, if the fifth bit is set to "1", the heap size of the field-name collection may be stored as a four-byte quantity.

Depending on the fourth bit of the flag field, the next two or four bytes of the root header segment may store the total size of the hierarchical tree of nodes. For example, if the fourth bit is set to "1", the heap size of the hierarchical tree of nodes may be stored as a four-byte quantity.

Depending on the third bit of the flag field, the next two or four bytes of the root header segment may store the total size of the field-value collection. For example, if the third bit is set to "1", the heap size of the field-value collection may be stored as a four-byte quantity.

Thus, for hierarchical data object 100 in FIG. 1, the root header segment may be "0xff010100008003300650047". In other words, the concatenation uses "version 1" of the binary encoding, uses one-byte hash codes, has eight unique field names, uses fifty-one bytes of memory to store the field names, uses 101 bytes of memory to store the hierarchical tree of nodes, and uses seventy-one bytes of memory to store the field values.

Approach for Compactly Representing Field Names

Efficient storage and navigation of hierarchical data object 100 may be achieved by storing a compact representation of field names. The compact representation may eliminate duplicate field names and/or reference each field name by an abbreviated identifier. FIG. 2 depicts example fields used to illustrate compactly representing field names. Referring to FIG. 2, table 200 depicts a relationship among field-name identifiers 202, field names 204, and hash codes 206. Hash-code mapping 208 is generated based on the relationship depicted in table 200.

Field names 204 include each unique field name within hierarchical data object 100. Each field name in field names 204 is assigned a field identifier in field identifiers 202. For example, field-name identifier "0x1" is assigned to "id", and field-name identifier "0x2" is assigned to "person".

Each of hash codes 206 corresponds to a field name in field names 204. Hash codes 206 are generated by applying a hash function to field names 204. As shall be explained in greater detail, hash codes 206 are used to efficiently perform field-name identifier resolution. Field-name identifier resolution refers to the operation of resolving field-name identifiers 202 to field names 204 and/or vice versa.

The hash function may take as input each of field names 204 and may output one or more hash codes 206. For example, the hash function may take as input "id" and output a 32-bit binary representation of the decimal number "678385920".

Each of hash codes 206 may correspond to one of field-name identifiers 202. The correspondence may be based on an ordering of hash codes 206 and field-name identifiers 202. Hash codes 206 and field-name identifiers 202 are shown in order in table 200. The first hash code "0x286f5900" corresponds to the first field-name identifier "0x1", the second hash code "0x30ace070" corresponds to the second field-name identifier "0x2", and so forth. The correspondence between field-name identifiers 202 and hash codes 206 may be generated by sorting hash codes 206 and then mapping each hash code, in a sort order, to a respective field-name identifier corresponding to the sort order.

As shall be explained later in greater detail, mapping hash codes 206 to field-name identifiers 202 based on an ordering enables an efficient resolution of which field-name identifier corresponds to a particular field name.

Binary representations of hash codes 206 may be sorted in an increasing or decreasing order. For example, hash codes 206 represented by decimal numbers "1951507059" and "−1743783776" may correspond to the binary representations "01110100 01010001 10100010 01110011" and "10011000 00001111 11111000 10100000", respectively. For an increasing sort order, "1951507059" would precede "−1743783776", because a binary representation of a positive decimal number is smaller than a binary representation of a negative decimal number.

Collisions may occur when the hash function takes as input different field names and outputs a same hash code. However, the collisions may be resolved based on respective lengths of the different field names and/or a comparison of each character in the different field names. Length information and/or character information may be stored in a field-name collection described in FIG. 3. For example, if different field names "book" and "store" both correspond to the same hash code, respective lengths of four bytes and five bytes may be used to distinguish the different field names. In another example, if different field names "book" and "idea" both correspond to the same hash code, respective lengths of the different field names may be unable to resolve a collision. Thus, a comparison of each character byte in the different field names may be used to distinguish "book" and "idea". However the different field names are distinguished, the same hash code may be assigned to different field-name identifiers to preserve a distinction between the different field names.

A particular hash code may uniquely identify a particular field name with occasional collisions. However, a portion of the particular hash code may uniquely identify the particular field name with a negligible difference in a number of collisions. Thus, the portion of the particular hash code may be treated as an equivalent of the particular hash code. The portion of the particular hash code may be a relatively distinctive portion of the particular hash code. In the example of FIG. 2, the relatively distinctive portion of the particular hash code is a most significant byte. However, in an embodiment, the relatively distinctive portion of the particular hash code may be a least significant byte. Storing the portion of the particular hash code as opposed to storing the particular hash code in its entirety may reduce storage needs and/or otherwise decrease computational overhead.

Hash-code mapping 208 may be generated based on the relationship depicted in table 200. Hash-code mapping 208 may be a sequence of portions of hash codes 206, where the order within the sequence is based on the order of hash codes 206. In the example of FIG. 2, "0x28" corresponds to the most significant byte of "0x286f5900", "0x30" corresponds to the most significant byte of "0x30ace070", and so forth. Note that each element of hash-code mapping 208 and each hash code in hash codes 206 follow the order of field-name identifiers 202. In other words, field-name identifiers 202 may be inferred by ordinal positions of hash codes 206 in hash-code mapping 208. Thus, logically implying instead of physically storing field-name identifiers 202 may reduce memory usage.

Hereinafter, hash codes 206 may refer to portions of hash codes 206 and/or hash codes 206 in their entireties. To save on storage space, a portion of a particular hash code is used in lieu of the particular hash code as the equivalent thereof.

Approach for Field-Name Identifier Resolution

Field-name identifier resolution may be performed efficiently using the mappings described by FIG. 2 and data structures described in FIG. 3. According to an embodiment, storage needs and/or computational overhead for field-name identifier resolution may be reduced by hash-code mapping 208.

Referring to FIG. 3, field names 204 are stored contiguously within a memory address space as field-name collection 300. In the example of FIG. 3, field names 204 are enclosed in quotation marks for clarity. However, in an embodiment, each character between a pair of quotation marks may correspond to a byte. For example, "person" may be stored as the six bytes "0x706572736f6e". Furthermore, each of field names 204 stored in field-name collection 300 may be adjacent to a length byte that indicates a length of a respective field name. For example, "person" may be preceded by "0x6" such that a portion of field-name collection 300 corresponding to "person" may be the seven bytes "0x06706572736f6e". Length bytes may be used instead of null bytes and may indicate boundaries between field names 204. Note that use of a single byte to indicate the length of each of field names 204 may impose a maximum length of 255 bytes to each of field names 204. However, in an embodiment, one or more additional bytes may augment the single byte if at least one of field names 204 exceeds 255 bytes in length.

Field-name mapping 302 may map field names 204 to offsets within field-name collection 300 based on respective field-name identifiers 202 of field names 204. The offsets may be byte offsets counting from the beginning of field-name collection 300. For example, in FIG. 3, "0x0007" is the first element of field-name mapping 302, which corresponds to field-name identifier "0x1" and field name "id". The offset "0x0007" references byte number seven, which is the relative offset for the portion of field-name collection 300 that corresponds to "id".

The number of bytes used to store each relative offset may be determined based on a total length of field-name collection 300. In the example of FIG. 3, each relative offset is two bytes, because a total size of field-name collection 300 can be represented in two bytes or less. Each unique field name may be stored once to reduce storage needs. Field names 204 may be stored in Universal Character Set Transformation Format-8 bit (UTF-8) encoding and/or any other character encoding.

Field-name mapping 302 may exhibit a one-to-one correspondence with hash-code mapping 208. Together, field-name mapping 302 and hash-code mapping 208 may provide a mapping between hash codes 206 and offset information for unique field names represented by hash codes 206. In the examples of FIG. 2 and FIG. 3, the one-to-one correspondence between hash codes 206 and the offset information may be maintained by field-name identifiers 202. For example, "0x28" and "0x0007" are the first elements of hash-code mapping 208 and field-name mapping 302, respectively. Thus, "0x28" and "0x0007" both correspond to a field-name identifier of "0x1". In an embodiment, field-name identifiers 202 are used to reference field names 204 in a hierarchical tree of nodes described in FIG. 4.

Substituting each of field names 204 with one of field-name identifiers 202 as an abbreviated identifier may result in substantial space-savings. Furthermore, if each of field-name identifiers 202 is a numeric identifier, lookup times for field-name identifiers 202, and thus field names 204, may be reduced by enabling binary searches on a field-name-identifier-to-child mapping described in FIG. 5.

In an embodiment, field-name identifier resolution may be performed prior to navigating a hierarchical tree of nodes described in FIG. 4. For example, a query may include path expression "$.person.location.city". In response to the query, a data source may apply a hash function to each of field names 204 in the path expression to yield a serialization of hash codes 206, such as "$.0x30.0x98.0x62". Based on hash-code mapping 208, the serialization of hash codes 206 may be converted into a serialization of field-name identifiers 202, such as "$.0x2.0x5.0x3". For example, a binary search may be performed on hash-code mapping 208 for each hash code in the serialization of hash codes 206. In the example of FIG. 2, hash-code mapping 208 may be an array of hash codes 206 that implicitly stores field-name identifiers 202 as positions corresponding to elements of the array. Thus, when a hash code is located in hash-code mapping 208, a position of the hash code indicates a corresponding field-name identifier for the hash code. For example, "0x28" is the first element of hash-code mapping 208 in FIG. 2, so "0x28" corresponds to field-name identifier "0x1".

Applying the hash function may involve resolving collisions based on hash-code mapping 208, field-name mapping 302, and/or field-name collection 300. When a binary search performed on hash-code mapping 208 locates a particular hash code in multiple positions of hash-code mapping 208, the multiple positions may indicate that multiple field-name identifiers 202 are associated with the particular hash code. For example, if "0x62" were located in both the third and fourth positions in hash-code mapping 208, there would be an ambiguity as to whether "city" corresponds to field-name identifier "0x3" or field-name identifier "0x4". Field-name mapping 302 and/or field-name collection 300 may be used to disambiguate which of the multiple field-name identifiers 202 corresponds to the particular hash code. For example, based on field-name mapping 302, field-name identifier "0x3" and field-name identifier "0x4" correspond to offset "0x002a" and offset "0x000f", respectively. Based on field-name collection 300, offset "0x002a" and offset "0x000f" correspond to "0x4'city'" and "0x9'birthdate'", respectively. Thus, hash code "0x62" may be determined to correspond to field-name identifier "0x3" based on length byte "0x4" and/or a string comparison of "city".

Example Hierarchical Tree of Nodes

Resolving a path expression may involve navigating hierarchical data object 100. Accelerated navigation of hierarchical data object 100 may be achieved by organizing hierarchical data object 100 as hierarchical tree of nodes 400. FIG. 4 depicts an example hierarchical tree of nodes. In the example of FIG. 4, hierarchical tree of nodes 400 comprises nodes 402-438. Leaf nodes comprise nodes 406, 408, 416, 418, 412, and 428-438. Non-leaf nodes comprise nodes 402, 404, 410, 414, and 420-426.

Hierarchical tree of nodes 400 may be a collection of data that is organized in a manner such that relationships among the data may be represented graphically as a tree. The data may be organized into nodes including leaf nodes and non-leaf nodes. Each level of the tree may correspond to at least a portion of a path expression. For example, a path expression of "$.person.friends[*]" may refer to at least three tree levels. In the example of FIG. 4, "person" may correspond to a first tree level including node 402, "friends" may correspond to a second tree level including node 404, and at least the open bracket "[" may correspond to a third tree level including nodes 406-414. The sub-trees represented by nodes 420 and 422 may correspond to the path expression in its entirety.

Nodes 402-438 may be contiguously stored within a memory address space as hierarchical tree of nodes 400. Boundaries between nodes may be maintained by header data described in FIG. 5. Unlike a leaf node, a non-leaf node may have one or more child nodes. A child node may be directly related to a parent node. In the example of FIG. 4, node 404 is a non-leaf node that has child nodes 406-414. Each child node may be a leaf node or a non-leaf node. A non-leaf node may be one of multiple node types, such as an object-type node or an array-type node. The object-type node may represent one or more field names 204. In the example of FIG. 4, node 402 may represent "person", and node 404 may represent "id", "birthdate", "location", "name", and "friends". The array-type node may introduce a group of object-type nodes. For example, node 414 may represent at least the open bracket "[" that immediately follows the colon after "friends" in hierarchical data object 100.

Non-leaf nodes may be navigated according to a query represented by a path expression. The path expression may include a serialization of field names 204. For example, path expression "$..friends[0].name" may correspond to a query for the name of the first element in the "friends" array that is associated with any initial field name. A data source, such as a database, may receive the query and apply the hash function to the path expression to obtain a serialization of hash codes 206, such as "$..0xe4[0].0xa2". Applying the hash function may involve computing lengths for field names 204 to resolve collisions. Based on hash-code mapping 208, the serialization of hash codes 206 may be translated into a serialization of field-name identifiers 202, such as "$..0x7[0].0x6". Based on child node mappings and field-name-identifier-to-child mappings described in FIG. 5, the serialization of field-name identifiers 202 may be translated into a sequence of nodes, such as "node 402.node 404.node 414.node 420.node 424.node 432".

A leaf node may represent a field value that corresponds to one or more field names 204. Thus, one or more leaf nodes may correspond to a path expression in its entirety. In the previous example, node 432 is a leaf node that represents field value "Mary" and that corresponds to path expression "$..friends[0].name". In another example, node 432 and node 438 may correspond to path expression "$.person.friends[*].name".

Example Non-Leaf Node

Figure 5:
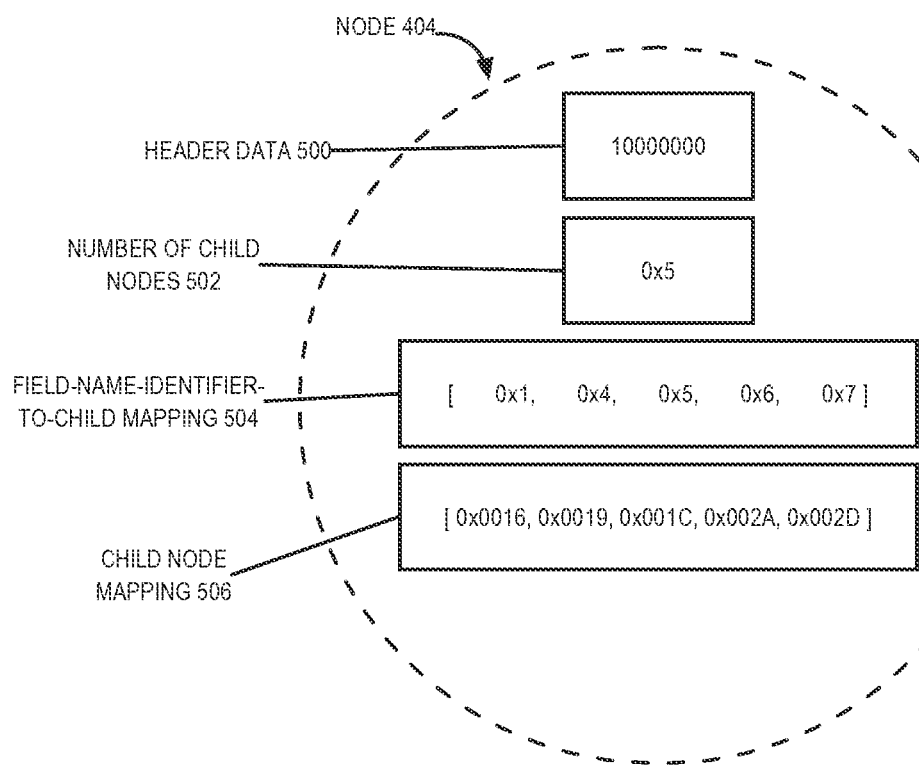
FIG. 5 depicts an example non-leaf node.

FIG. 5 depicts an example non-leaf node. In the example of FIG. 5, node 404 comprises header data 500, number of child nodes 502, field-name-identifier-to-child mapping 504, and child node mapping 506.

Header data 500 may be a flag field indicating information about a particular node of hierarchical tree of nodes 400. In an embodiment, header data 500 may be a single byte at the beginning of a particular node. The most significant two bits may indicate a node type. For example, "10" may indicate an object-type node, "11" may indicate an array-type node, and "00" or "01" may indicate a leaf node type. The third most significant bit may indicate a number of bytes used to store offset information in the particular node. For example, "1" may indicate that each of the offset information is stored in four bytes, and "0" may indicate that each of the offset information is stored in two bytes. If the particular node is an object-type node or an array-type node, the fourth and fifth most significant bits may indicate a number of bytes used to store a total number of child nodes of the particular node. For example, "00", "01", and "10" may indicate that the total number of child nodes is stored in one, two, and four bytes, respectively. In the example of FIG. 5, header data 500 is "10000000", which may indicate that node 404 is an object-type node, node 404 stores offset information in two bytes, and the total number of child nodes is stored in one byte.

Number of child nodes 502 may indicate a total number of child nodes of a particular non-leaf node. In the example of FIG. 5, node 404 has five child nodes as indicated by "0x5". Further information about child nodes of a particular non-leaf node are provided in one or more mappings stored in the particular non-leaf node.

If a particular non-leaf node is an object-type node, the particular non-leaf node may include field-name-identifier-to-child mapping 504. Field-name-identifier-to-child mapping 504 may be stored in the particular non-leaf node as a mapping between one or more field-name identifiers 202 and one or more child nodes of the particular non-leaf node. In the example of FIG. 5, field-name-identifier-to-child mapping 504 may be an array that stores field-name identifiers 202 as elements. Each position in the array may correspond to a particular child node. For example, in FIG. 5, the first element in field-name-identifier-to-child mapping 504 is field-name identifier "0x1", and the first position in field-name-identifier-to-child mapping 504 corresponds to node 406. Thus, "0x1" corresponds to node 406.

Sorting field-name identifiers 202 prior to storing field-name identifiers 202 in field-name-identifier-to-child mapping 504 enables a binary search to be performed on field-name-identifier-to-child mapping 504 for a particular field-name identifier. For example, if field name "id" is part of a path expression that is being resolved, "id" may be associated with field-name identifier "0x1". In an embodiment, a hash function may associate field name "id" with hash code "0x28", which is then associated with field-name identifier "0x1". The hash code may be pre-computed during path compile time. If the field-name identifier associated with the hash code is absent from a memory cache, the field-name identifier may be obtained based on a binary search of hash-code mapping 208. Field-name mapping 302 and field-name collection 300 may be used to check for collisions. The memory cache may store an association between field-name identifier "0x1" and field name "id". The binary search performed on field-name-identifier-to-child mapping 504 for "0x1" may compare "0x1" to "0x5", which is determined to be a midpoint of field-name-identifier-to-child mapping 504. Since "0x1" is less than "0x5", the binary search may continue in the first half of field-name-identifier-to-child mapping 504. The binary search may repeatedly divide field-name-identifier-to-child mapping 504 into successive halves until the binary search locates "0x1" in the first position, which corresponds to node 406.

Child node mapping 506 may be stored, in a particular non-leaf node, as a mapping between tree offset information and one or more child nodes of the particular non-leaf node. The particular non-leaf node may be an object-type node or an array-type node.

The tree offset information may be a relative offset in hierarchical tree of nodes 400. The relative offset may be a byte offset counting from the beginning of hierarchical tree of nodes 400. In the example of FIG. 5, child node mapping 506 may be an array that stores tree offset information as elements. Each position in the array may correspond to a particular child node. For example, in FIG. 5, "0x0016" is the first element in child node mapping 506, and the first position in child node mapping 506 corresponds to node 406. Thus, node 406 may be located at a relative offset of "0x0016" in hierarchical tree of nodes 400.

For hierarchical data object 100 in FIG. 1, the following table provides tree offset information for each node in hierarchical tree of nodes 400. The "Node" column may depict hierarchical tree of nodes 400 contiguously stored within a memory address space as an array of nodes.

| Offset | Node |
| --- | --- |
| 0x0000 | Node 402 |
| 0x0005 | Node 404 |
| 0x0016 | Node 406 |
| 0x0019 | Node 408 |
| 0x001c | Node 410 |
| 0x0024 | Node 416 |
| 0x0027 | Node 418 |
| 0x002a | Node 412 |
| 0x002d | Node 414 |
| 0x0033 | Node 420 |
| 0x0038 | Node 424 |
| 0x0043 | Node 428 |
| 0x0046 | Node 430 |
| 0x0049 | Node 432 |
| 0x004c | Node 422 |
| 0x0051 | Node 426 |
| 0x005c | Node 434 |
| 0x005f | Node 436 |
| 0x0062 | Node 438 |

Child node mapping 506 may exhibit a one-to-one correspondence with field-name-identifier-to-child mapping 504. Together, child node mapping 506 and field-name-identifier-to-child mapping 504 may provide a mapping between field-name identifiers 202 and tree offset information for child nodes. In the example of FIG. 5, the one-to-one correspondence between field-name identifiers 202 and tree offset information may be maintained by positions that each correspond to a child node. For example, "0x1" and "0x0016" are the first elements of field-name-identifier-to-child mapping 504 and child node mapping 506, respectively. Thus, "0x1" and "0x0016" both correspond to a child node—namely node 406.

Tree offset information may enable a direct "jump" to a particular child node corresponding to the tree offset information. In an embodiment, the direct "jump" may be performed in constant time O(1). Thus, resolving a path expression may be as slow as a binary search performed on field-name-identifier-to-child mapping 504 of an object-type node to find a particular field-name identifier. Note that an array-type node may be unconcerned with field-name identifiers 202 and may simply provide tree offset information based on an array element number indicated in a path expression.

Example Leaf Node and Example Field-Value Collection

FIG. 6 depicts an example leaf node and an example field-value collection. In the example of FIG. 6, node 408 comprises header data 500 and field-value location 600. Field-value location 600 may correspond to a portion of field-value collection 602.

Header data 500 for a leaf node may differ from header data 500 for a non-leaf node in the last five bits. For a leaf node, the last five bits may indicate a data type. For example, "00000", "00001", and "00010" may indicate a null value, a Boolean true value, and a Boolean false value, respectively. "00011", "00100", and "00101" may indicate a string value with length information for the string value stored in one, two, and four bytes, respectively. "00110" may indicate a number value with length information for the number value stored in one byte. "00111" and "01000" may indicate a float value and a double precision value, respectively. "01001", "01010", and "01011" may indicate a date value, a timestamp value, and a timestamp with time zone value, respectively. "01100" and "01101" may indicate a year-month interval and a day-second interval, respectively. "01110", "01111", and "10000" may indicate a Big-Endian signed binary integer of length two, four, and eight bytes, respectively. In the example of FIG. 6, node 408 has header data 500 of "01001001", which may indicate that node 408 is a leaf node, node 408 stores offset information in two bytes, and field-value location 600 references a date value.

Field-value location 600 may be a relative offset in field-value collection 602. The relative offset may be a byte offset counting from the beginning of field-value collection 602. The relative offset may be a pointer that references a portion of field-value collection 602 corresponding to a particular field value. In an embodiment, the number of bytes used to store the relative offset may vary depending on where the relative offset points in field-value collection 602. For example, if a total size of field-value collection 602 exceeds 65,535 bytes, relative offsets that point within the first 65,535 bytes of field-value collection 602 may each be stored in two bytes, and relative offsets that point outside of the first 65,535 bytes may each be stored in four bytes.

In the example of FIG. 6, "0x0004" is field-value location 600 that references the fourth byte in field-value collection 602. The fourth byte corresponds to a starting byte for a portion of field-value collection 602 that corresponds to field value "1970-01-02". In an embodiment, a leaf node may include at most one field-value location 600. For example, values for some data types, such as a null value, a Boolean true value, and a Boolean false value, may be inherently encoded in header data 500. Thus, storing the values for some data types in field-value collection 602 may be unnecessary, thereby rendering corresponding field-value locations unnecessary.

Field values may be contiguously stored within a memory address space as field-value collection 602. Each unique field value may be stored once to reduce storage needs. Field values may be stored in UTF-8 encoding and/or any other character encoding. Additionally or alternatively, field values may be stored in encoded binary values representing integers, binary floating-point numbers, decimal numbers, date/time values, and/or other data types. Field values may exhibit a fixed length and/or a variable length. Field values that exhibit a variable length may be stored adjacent to a length byte that indicates a length of a corresponding field value. For example, "Mary" may be a string value that exhibits a variable length, so "Mary" may be stored after a length byte of "0x4". Thus, a portion of field-value collection 602 corresponding to "Mary" may be the five bytes "0x044d617279". The length byte may indicate boundaries for a corresponding field value.

Field-value collection 602 may be the last segment in the concatenation that includes the root header segment, hash-code mapping 208, field-name mapping 302, field-name collection 300, and/or hierarchical tree of nodes 400. Field-value collection 602 may be preceded by hierarchical tree of nodes 400 in order to avoid shifting hierarchical tree of nodes 400 if field-value collection 602 grows.

Approach for Encoding Hierarchical Data Objects

Figure 7:
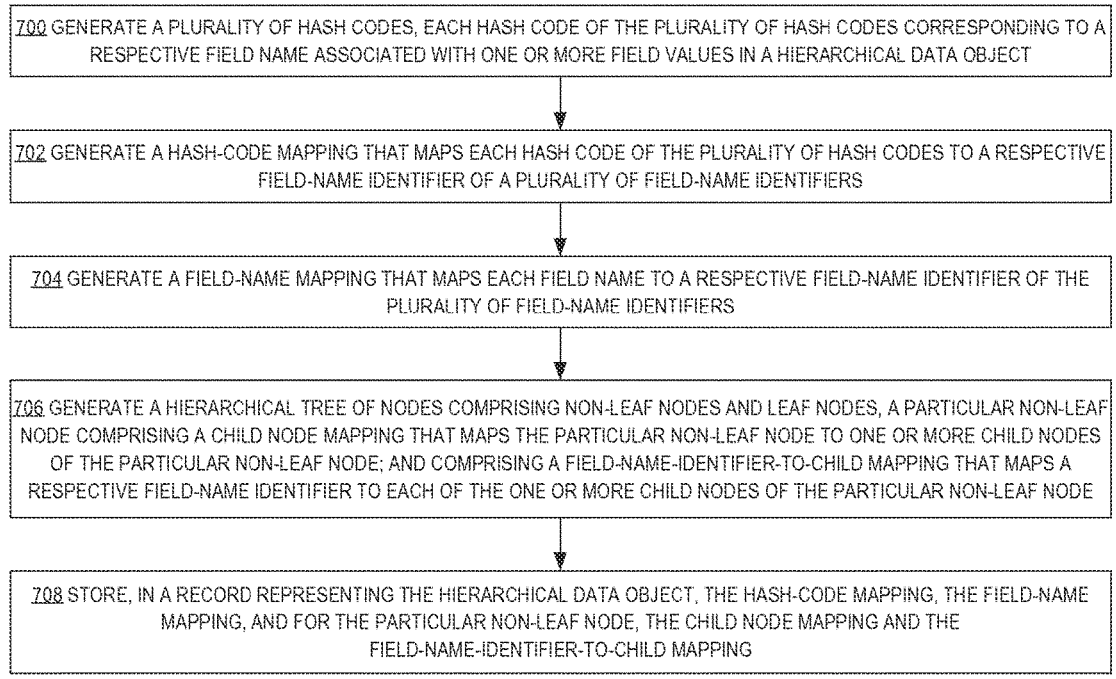
FIG. 7 is a flow diagram that depicts an approach for encoding hierarchical data objects to support efficient navigation.

FIG. 7 is a flow diagram that depicts an approach for encoding hierarchical data objects to support efficient navigation. At block 700, a plurality of hash codes 206 are generated. Each hash code of the plurality of hash codes 206 may correspond to a respective field name associated with one or more field values in hierarchical data object 100. Each hash code may be generated based on a standard hash function.

At block 702, hash-code mapping 208 is generated. Hash-code mapping 208 may map each hash code of the plurality of hash codes 206 to a respective field-name identifier of a plurality of field-name identifiers 202. In an embodiment, hash-code mapping 208 may store a relatively distinctive portion of each hash code to reduce storage needs.

At block 704, field-name mapping 302 is generated. Field-name mapping 302 may map each field name to a respective field-name identifier of the plurality of field-name identifiers 202. Additionally or alternatively, field-name mapping 302 may map offset information for each field name to a respective field-name identifier. The offset information for a particular field name may be a pointer to a portion of field-name collection 300 that corresponds to the particular field name.

At block 706, hierarchical tree of nodes 400 is generated. Hierarchical tree of nodes 400 may include leaf nodes and non-leaf nodes. A particular non-leaf node may comprise a child node mapping 506 that maps the particular non-leaf node to one or more child nodes of the particular non-leaf node. For example, each position in child node mapping 506 may correspond to a respective child node of the particular non-leaf node that stores child node mapping 506, thereby mapping the particular non-leaf node to the respective child node. Additionally, the particular non-leaf node may comprise a field-name-identifier-to-child mapping 504 that maps a respective field-name identifier of the plurality of field-name identifiers 202 to each of the one or more child nodes of the particular non-leaf node. For example, each position in field-name-identifier-to-child mapping 504 may correspond to a respective child node, and each position in field-name-identifier-to-child mapping 504 may store a respective field-name identifier.

At block 708, hash-code mapping 208, field-name mapping 302, and for the particular non-leaf node, child node mapping 506 and field-name-identifier-to-child mapping 504, are stored in a record representing hierarchical data object 100. For example, hash-code mapping 208, field-name mapping 302, child node mapping 506, and field-name-identifier-to-child mapping 504 may be stored in a concatenation that may also include a root header segment, field-name collection 300, hierarchical tree of nodes 400, and/or field-value collection 602. The concatenation may be stored in a Binary Large Object (BLOB) field of a database, a flat file, and/or any other sequence of bytes accessible via standard block-device interfaces (e.g., open, close, seek, read, write). Additionally or alternatively, the concatenation may be transmitted as part of a standard network protocol, such as Hypertext Transfer Protocol (HTTP).

Example Path Expression

Hierarchical data objects may be navigated in response to a query. The query may include a path expression. The path expression may include a sequence of "path steps" that are separated by a delimiter, such as "." or "/". A path step may correspond to one or more field names in a hierarchical data object 100. The sequence of path steps may correspond to one or more field values in the hierarchical data object 100.

For example, "$.person.name" may be a path expression applied over hierarchical data object 100 in FIG. 1. The "$" specifies the context of the path expression, which by default is the hierarchical data object 100 over which the path expression is being resolved. The path step "person" specifies a parent node associated with a field name of "person". The path step "name" specifies a child node associated with a field name of "name". In the example of FIG. 1, the path expression may be resolved into a field value of "john" based on using the path steps to navigate hierarchical data object 100.

A path expression may also specify predicates or criteria for a path step. For example, "$.person.friends[*].birthdate>TO_DATE('1970-01-01', 'YYYY-MM-DD')" may be a path expression including a predicate specifying one or more field values that are greater than the date value "1970-01-01". In the example of FIG. 1, the path expression may be resolved into a field value of "1972-03-03".

Approach for Executing a Query Over Hierarchical Data Objects

Figure 8:
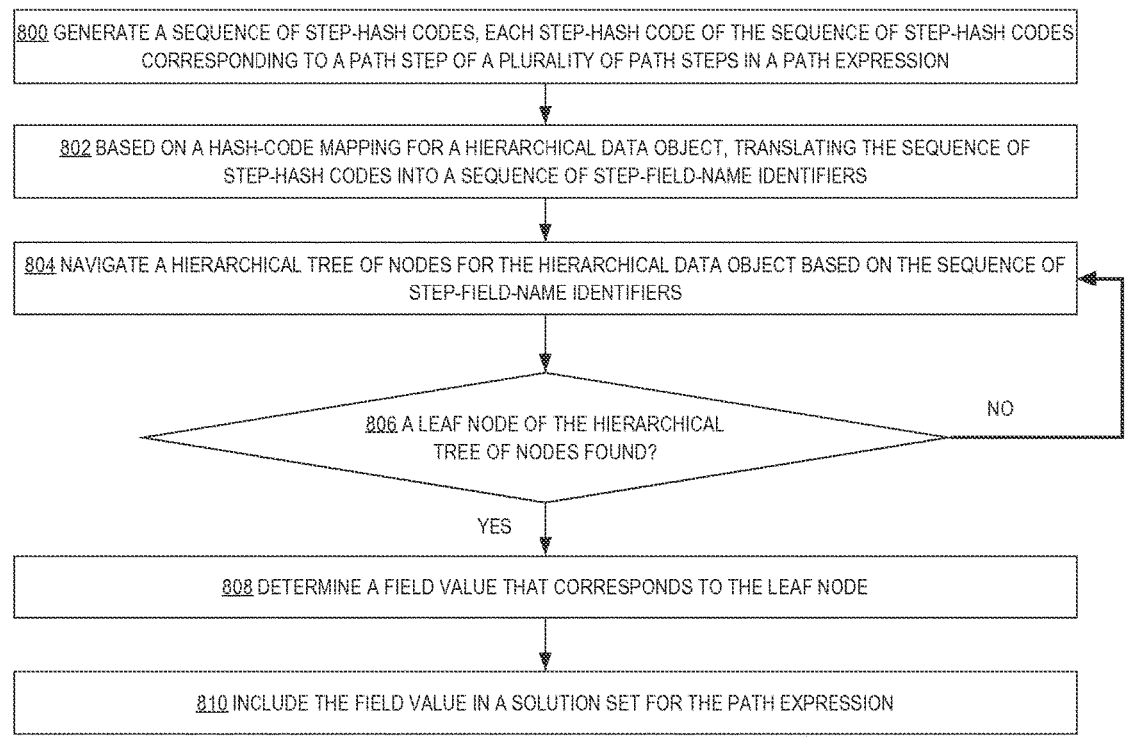
FIG. 8 is a flow diagram that depicts an approach for executing a query over hierarchical data objects.

FIG. 8 is a flow diagram that depicts an approach for executing a query over hierarchical data objects. At block 800, a sequence of step-hash codes is generated. A step-hash code may be one of hash codes 206 that corresponds to a path step in a path expression. The sequence of step-hash codes may be generated based on applying a hash function to each distinct field name in the path expression. For example, the path expression "$..friends[*].id" may be translated into the sequence of step-hash codes "$..0xe4[*].0x28".

At block 802, the sequence of step-hash codes is translated into a sequence of step-field-name identifiers. A step-field-name identifier may be one of field-name identifiers 202 that corresponds to a path step in a path expression. The sequence of step-hash codes may be translated into the sequence of step-field-name identifiers based on a hash-code mapping 208 for a hierarchical data object 100. A binary search for a particular step-hash code may be performed on the hash-code mapping 208 in order to find a corresponding step-field-name identifier. For example, hash-code mapping 208 in FIG. 2 indicates that the step-hash code "0xe4" is the seventh element, which corresponds to the step-field-name identifier "0x7", and that the step-hash code "0x28" is the first element, which corresponds to the step-field-name identifier "0x1". Thus, the sequence of step-hash codes "$..0xe4[*].0x28" is translated into the sequence of step-field-name identifiers "$..0x7 [*].0x1".

At block 804, a hierarchical tree of nodes 400 for the hierarchical data object 100 is navigated based on the sequence of step-field-name identifiers. For example, the sequence of step-field-name identifiers "$..0x7[*].0x1" indicates that any node of the hierarchical tree of nodes 400 may be a starting node. In the example of FIG. 4, node 402 is the only possible choice, but if multiple root nodes were present, navigation may proceed from each root node. Navigation may proceed from a particular root node of the multiple root nodes until it is determined that further navigating the particular root node will be unnecessary for resolving the path expression. This determination may be based on the non-existence of a particular node that is a descendant of the root node and that corresponds to a particular path step of the path expression.

Navigating the hierarchical tree of nodes 400 may involve determining one or more immediately subsequent nodes (e.g., child nodes) based on a field-name-identifier-to-child mapping 504 of a current node. For example, field-name-identifier-to-child mapping 504 of node 404 may be searched for the step-field-name identifier "0x7". Searching for a particular step-field-name identifier may involve performing a binary search on a field-name-identifier-to-child mapping 504. In the example of FIG. 5, the step-field-name identifier "0x7" is identified as the last element of field-name-identifier-to-child mapping 504. Based on child node mapping 506, the last element of field-name-identifier-to-child mapping 504 corresponds to the offset "0x002D", which refers to a memory location for node 414.

At block 806, it is determined whether a leaf node of the hierarchical tree of nodes 400 has been found. If a leaf node has been found, block 806 proceeds to block 808. Otherwise, block 806 proceeds to block 804 for further navigation. For example, node 414 is not a leaf node in FIG. 4, so navigation continues along node 420 and node 424 until node 428, which is a leaf node, is found.

At block 808, a field value that corresponds to the leaf node is determined. Determining a corresponding field value for a particular leaf node may be based on a field-value location 600 of the particular leaf node. For example, field-value location 600 of node 428 may indicate the offset "0x20", which corresponds to byte number thirty-two of field-value collection 602 in FIG. 6. This offset is associated with the field value "456".

At block 810, the field value is included in a solution set for the path expression. If more than one solution is possible, block 810 may proceed to block 804 for further navigation. Otherwise, the solution set may be returned as a query result. For example, the field value "456" may be included in the solution set for the path expression "$..friends[*].id". However, the wildcard symbol in the path expression indicates that more than one solution is possible, so the second solution "789" is found by navigating along node 402, node 404, node 414, node 422, node 426, and node 434. When it is determined that no other solutions are possible, the solution set "{456, 789}" may be returned in response to the query.

Example in-Memory Optimization

In the foregoing description, hash-code mapping 208, field-name mapping 302, field-name collection 300, hierarchical tree of nodes 400, field-name-identifier-to-child mapping 504, child node mapping 506, and/or field-value collection 602 are described as one or more portions of a heap, one or more memory blocks, and/or one or more data structures that are transportable and that are used to generate one or more in-memory representations. Thus, compact representations may enable caching and/or pre-loading a memory cache for further optimization. For example, depending on a total size of hierarchical data object 100, different policies for lazy-loading hierarchical tree of nodes 400 may be used. For a small to medium-sized hierarchical data object 100, hierarchical tree of nodes 400 in its entirety may be pre-loaded into memory. For a large hierarchical data object 100, one or more portions of hierarchical tree of nodes 400 may be loaded into memory on an "as-needed" basis.

However, in an in-memory optimization, transportability may be sacrificed to generate one or more in-memory data streams including hash-code mapping 208, field-name mapping 302, field-name collection 300, hierarchical tree of nodes 400, field-name-identifier-to-child mapping 504, child node mapping 506, and/or field-value collection 602. Actual memory addresses may be used instead of offsets to ensure platform independence.

Example Optimizations Involving Multiple Hierarchical Data Objects

When a query is executed over multiple hierarchical data objects, efficient query processing may be based on reducing duplicative computations for each of the multiple hierarchical data objects. In an embodiment, the duplicative computations may include re-computing step-hash codes. For example, when a path expression is applied over a plurality of hierarchical data objects, re-computing step-hash codes for each hierarchical data object 100 in the plurality of hierarchical data objects may be rendered unnecessary based on pre-computing the step-hash codes. Pre-computing the step-hash codes may involve computing the step-hash codes for distinct field names in the path expression prior to run time (e.g., during compile time) for the path expression. Thus, a sequence of step-hash codes representing the path expression may be generated simultaneously for each of the plurality of hierarchical data objects.

Homogeneous hierarchical data objects may be hierarchical data objects that share structure. For example, each of a plurality of homogeneous hierarchical data objects may represent a person, share a same data type, and/or represent a same kind of object. Thus, hash-code mapping 208, field-name mapping 302, and/or field-name collection 300 may be similar, if not the same, for each of the plurality of homogeneous hierarchical data objects.

In an embodiment, the similarity of homogeneous hierarchical data objects may be leveraged to support efficient query processing based on reducing duplicative computations. For example, computing one or more step-hash codes and/or one or more step-field-name identifiers for a first hierarchical data object may be avoided. This may be accomplished based on sharing field-name mapping 302 of a second hierarchical data object. In other words, when resolving a path expression over the first hierarchical data object, one or more paths steps of the path expression may be directly translated into a sequence of field-name identifiers based on checking field-name mapping 302 of the second hierarchical data object. Field-name mapping 302 may be checked for the one or more step-field-name identifiers that have already been computed for the one or more path steps when the path expression or a different path expression was resolved over the second hierarchical data object. For example, a mapping between the one or more step-field-name identifiers and the one or more path steps may be cached. If the one or more step-field-name identifiers refer to one or more field names 204 in field-name collection 300 that correspond with the one or more path steps, the one or more step-field-name identifiers may be determined to correspond with the one or more path steps.

Example Set-Oriented Optimization

As with a single hierarchical data object 100, a set of hierarchical data objects may be encoded in the aforementioned manner prior to being persisted to disk and/or loaded as an in-memory auxiliary structure. However, for online analytical processing (OLAP) data warehouse applications, a set-based encoding may exhibit better compression and may support vectorized query processing. Homogeneous hierarchical data objects are often stored as a set of hierarchical data objects. Thus, some field names and/or field values may be common to multiple hierarchical data objects. By eliminating duplicate field names and/or field values, a set-level consolidation of field name and/or field value information may further reduce data storage needs and lower input/output costs. For example, set-level compression may result in fast scans of multiple hierarchical data objects, and the resultant space savings may enable in-memory representations that are suitable for single instruction, multiple data (SIMD) operations.

Each hierarchical data object 100 in the set of hierarchical data objects may have its own hierarchical tree of nodes 400. However, the set of hierarchical data objects may share a common hash-code mapping, a common field-name mapping, and/or a common field name collection. For example, the common hash-code mapping may be obtained by consolidating a respective hash-code mapping of each hierarchical data object 100 in the set of hierarchical data objects, thereby achieving set-level compression of hash codes. Additionally or alternatively, the set of hierarchical data objects may share a common field-value collection.

However, in an embodiment, the set of hierarchical data objects may also share a common hierarchical tree of nodes. Each hierarchical data object 100 of the set of hierarchical data objects may be assigned an instance identifier, such as an ordinal number. A respective hierarchical tree of nodes for each hierarchical data object 100 of the set of hierarchical data objects may be merged into a super hierarchical tree of nodes. Each node in the super hierarchical tree of nodes may store a compressed bitmap. The compressed bitmap of a particular node may store a respective instance identifier of each hierarchical data object 100 that share the particular node. A leaf node in the super hierarchical tree of nodes may include an array of compressed bitmaps. Each of the compressed bitmaps in the array may correspond to a different field-value identifier and may store a respective instance identifier of each hierarchical data object 100 that share a particular field value that corresponds to the different field-value identifier. Thus, navigation of the set of hierarchical data objects may be performed concurrently for each hierarchical data object 100 in the set of hierarchical data objects.

For online transaction processing (OLTP) applications, storing an encoded hierarchical data object into BLOB fields may provide optimal performance, and maintaining a set-based representation may be computationally expensive. Thus, the primary storage format may be a single encoded hierarchical data object 100. Set-level encoding may be reserved for a derivative on-disk structure or in-memory structure. An on-disk structure may be off-loaded for vector-based scanning on disk cell servers, for example.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
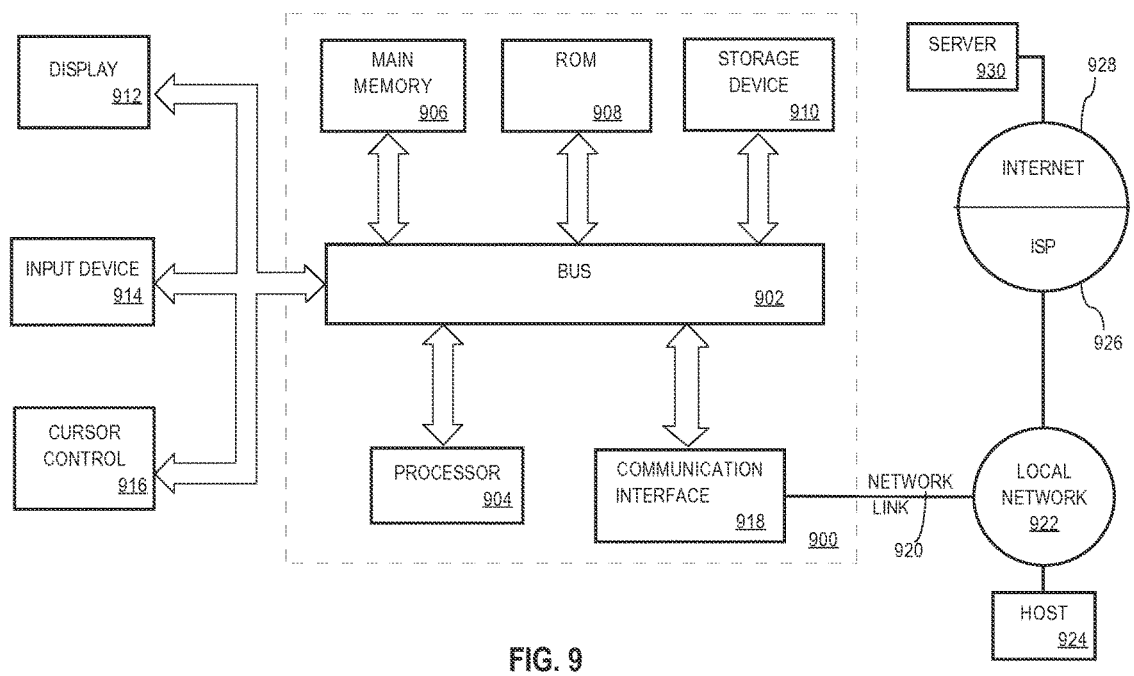
FIG. 9 depicts a computer system upon which an embodiment may be implemented.

For example, FIG. 9 is a block diagram that depicts a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   for a hierarchical data object comprising field names that are each associated with one or more field values in said hierarchical data object, generating a plurality of hash codes, each hash code of said plurality of hash codes corresponding to a respective field name of said field names;
   generating a hash-code mapping that maps each hash code of said plurality of hash codes to a respective field-name identifier of a plurality of field-name identifiers;
   generating a field-name mapping that maps each field name of said field names to a respective field-name identifier of said plurality of field-name identifiers;
   generating a hierarchical tree of nodes, wherein said hierarchical tree of nodes comprises non-leaf nodes and leaf nodes, wherein a particular non-leaf node of said non-leaf nodes comprises:
      a child node mapping that maps said particular non-leaf node to one or more child nodes of said particular non-leaf node; and
      a field-name-identifier-to-child mapping that maps a respective field-name identifier of said plurality of field-name identifiers to each of said one or more child nodes of said particular non-leaf node;
   storing, in a record representing said hierarchical data object, said hash-code mapping, said field-name mapping, and for said particular non-leaf node of said non-leaf nodes, the child node mapping and the field-name-identifier-to-child mapping; and
   wherein said method is performed by one or more computing devices.

2. The method of claim 1, wherein generating said hash-code mapping comprises:
   sorting said plurality of hash codes prior to storing said plurality of hash codes in said hash-code mapping.

3. The method of claim 1, wherein, for each field-name identifier of said plurality of field-name identifiers, said field-name mapping references a respective memory location in a field-name collection, said field-name collection contiguously storing said field names and lengths of said field names within a memory address space.

4. The method of claim 3, wherein generating said hash-code mapping comprises: resolving duplicate hash codes based on said field-name collection.

5. The method of claim 1, wherein each leaf node of said leaf nodes references a respective memory location of a corresponding field value in a field-value collection, said field-value collection contiguously storing said field values within a memory address space.

6. The method of claim 5, wherein said hash-code mapping, said field-name mapping, and said field-value collection are shared by a plurality of hierarchical data objects.

7. One or more non-transitory storage media storing instructions which, when processed by one or more computing devices, cause:
   for a hierarchical data object comprising field names that are each associated with one or more field values in said hierarchical data object, generating a plurality of hash codes, each hash code of said plurality of hash codes corresponding to a respective field name of said field names;
   generating a hash-code mapping that maps each hash code of said plurality of hash codes to a respective field-name identifier of a plurality of field-name identifiers;
   generating a field-name mapping that maps each field name of said field names to a respective field-name identifier of said plurality of field-name identifiers;
   generating a hierarchical tree of nodes, wherein said hierarchical tree of nodes comprises non-leaf nodes and leaf nodes, wherein a particular non-leaf node of said non-leaf nodes comprises:
      a child node mapping that maps said particular non-leaf node to one or more child nodes of said particular non-leaf node; and
      a field-name-identifier-to-child mapping that maps a respective field-name identifier of said plurality of field-name identifiers to each of said one or more child nodes of said particular non-leaf node; and
   storing, in a record representing said hierarchical data object, said hash-code mapping, said field-name mapping, and for said particular non-leaf node of said non-leaf nodes, the child node mapping and the field-name-identifier-to-child mapping.

8. The one or more non-transitory storage media of claim 7, wherein generating said hash-code mapping comprises:
   sorting said plurality of hash codes prior to storing said plurality of hash codes in said hash-code mapping.

9. The one or more non-transitory storage media of claim 7, wherein, for each field-name identifier of said plurality of field-name identifiers, said field-name mapping references a respective memory location in a field-name collection, said field-name collection contiguously storing said field names and lengths of said field names within a memory address space.

10. The one or more non-transitory storage media of claim 9, wherein generating said hash-code mapping comprises:
    resolving duplicate hash codes based on said field-name collection.

11. The one or more non-transitory storage media of claim 7, wherein each leaf node of said leaf nodes references a respective memory location of a corresponding field value in a field-value collection, said field-value collection contiguously storing said field values within a memory address space.

12. The one or more non-transitory storage media of claim 11, wherein said hash-code mapping, said field-name mapping, and said field-value collection are shared by a plurality of hierarchical data objects.

13. A method comprising:
    for a hierarchical data object comprising field names that are associated with field values in said hierarchical data object, storing a representation of said hierarchical data object, wherein said representation of said hierarchical data object comprises a hash-code mapping and a hierarchical tree of nodes, wherein said hash-code mapping maps each field hash code of a plurality of field hash codes to a respective field-name identifier of a plurality of field-name identifiers, wherein said hierarchical tree of nodes comprises non-leaf nodes and leaf nodes, wherein said field values correspond to said leaf nodes, wherein a particular non-leaf node of said non-leaf nodes comprises:
   a child node mapping that maps said particular non-leaf node to one or more child nodes of said particular non-leaf node; and
   a field-name-identifier-to-child mapping that maps a respective field-name identifier of said plurality of field-name identifiers to each of said one or more child nodes of said particular non-leaf node;
to resolve a path expression comprising a plurality of path steps:
   generating a sequence of step-hash codes, each step-hash code of said sequence corresponding to a path step of said plurality of path steps;
   based on said hash-code mapping, translating said sequence of step-hash codes into a sequence of step-field-name identifiers;
   navigating said hierarchical tree of nodes based on said sequence of step-field-name identifiers;
wherein said method is performed by one or more computing devices.

14. The method of claim 13, wherein navigating said hierarchical tree of nodes based on said sequence of step-field-name identifiers comprises:
   for each step-field-name identifier of said sequence of step-field-name identifiers, determining one or more corresponding non-leaf nodes based on said field-name-identifier-to-child mapping.

15. The method of claim 13, wherein navigating said hierarchical tree of nodes based on said sequence of step-field-name identifiers comprises:
   finding a particular step-field-name identifier in said field-name-identifier-to-child mapping based on performing a binary search on said field-name-identifier-to-child mapping.

16. The method of claim 13, wherein based on said hash-code mapping, translating said sequence of step-hash codes into said sequence of step-field-name identifiers comprises:
   finding a particular step-field-name identifier in said hash-code mapping based on performing a binary search on said hash-code mapping.

17. The method of claim 13, wherein generating said sequence of step-hash codes comprises:
   using a same set of step-hash codes for each hierarchical data object of a plurality of hierarchical data objects to resolve said path express over said plurality of hierarchical data objects.

18. The method of claim 13, wherein a similar hierarchical data object shares a field-name mapping of the hierarchical data object in such a manner that avoids computing, by the one or more computing devices, one or more step-hash codes for the similar hierarchical data object, the field-name mapping storing a relationship between each field name of said field names and a respective field-name identifier of said plurality of field-name identifiers.

19. One or more non-transitory storage media storing instructions which, when processed by one or more computing devices, cause:
   for a hierarchical data object comprising field names that are associated with field values in said hierarchical data object, storing a representation of said hierarchical data object, wherein said representation of said hierarchical data object comprises a hash-code mapping and a hierarchical tree of nodes, wherein said hash-code mapping maps each field hash code of a plurality of field hash codes to a respective field-name identifier of a plurality of field-name identifiers, wherein said hierarchical tree of nodes comprises non-leaf nodes and leaf nodes, wherein said field values correspond to said leaf nodes, wherein a particular non-leaf node of said non-leaf nodes comprises:
   a child node mapping that maps said particular non-leaf node to one or more child nodes of said particular non-leaf node; and
   a field-name-identifier-to-child mapping that maps a respective field-name identifier of said plurality of field-name identifiers to each of said one or more child nodes of said particular non-leaf node;
to resolve a path expression comprising a plurality of path steps:
   generating a sequence of step-hash codes, each step-hash code of said sequence corresponding to a path step of said plurality of path steps;
   based on said hash-code mapping, translating said sequence of step-hash codes into a sequence of step-field-name identifiers;
navigating said hierarchical tree of nodes based on said sequence of step-field-name identifiers.

20. The one or more non-transitory storage media of claim 19, wherein navigating said hierarchical tree of nodes based on said sequence of step-field-name identifiers comprises:
   for each step-field-name identifier of said sequence of step-field-name identifiers, determining one or more corresponding non-leaf nodes based on said field-name-identifier-to-child mapping.

21. The one or more non-transitory storage media of claim 19, wherein navigating said hierarchical tree of nodes based on said sequence of step-field-name identifiers comprises:
   finding a particular step-field-name identifier in said field-name-identifier-to-child mapping based on performing a binary search on said field-name-identifier-to-child mapping.

22. The one or more non-transitory storage media of claim 19, wherein based on said hash-code mapping, translating said sequence of step-hash codes into said sequence of step-field-name identifiers comprises:
   finding a particular step-field-name identifier in said hash-code mapping based on performing a binary search on said hash-code mapping.

23. The one or more non-transitory storage media of claim 19, wherein generating said sequence of step-hash codes comprises:
   using a same set of step-hash codes for each hierarchical data object of a plurality of hierarchical data objects to resolve said path expression over said plurality of hierarchical data objects.

24. The one or more non-transitory storage media of claim 19, wherein the instructions include instructions, that when executed by said one or more computing devices, cause a similar hierarchical data object to share a field-name mapping of the hierarchical data object in such a manner that avoids computing, by the one or more computing devices, one or more step-hash codes for the similar hierarchical data object, the field-name mapping storing a relationship between each field name of said field names and a respective field-name identifier of said plurality of field-name identifiers.

* * * * *

UNITED STATES PATENT AND TRADEMARK OFFICE
CERTIFICATE OF CORRECTION

PATENT NO. : 10,262,012 B2
APPLICATION NO. : 14/836680
DATED : April 16, 2019
INVENTOR(S) : Liu et al.

It is certified that error appears in the above-identified patent and that said Letters Patent is hereby corrected as shown below:

In the Claims

In Column 21, Line 51, in Claim 17, delete "express" and insert -- expression --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*